(12) United States Patent
Chuang et al.

(10) Patent No.: US 6,404,558 B1
(45) Date of Patent: Jun. 11, 2002

(54) PROJECTION DISPLAY WITH COLOR SEPARATION/SYNTHESIZING PRISM UNIT

(75) Inventors: Fu-Ming Chuang; Sheng-Hsiung Chan, both of Hsin-Chu Hsien (TW)

(73) Assignee: Prokia Technology Co., Ltd., Tainan Hsien (HK)

( * ) Notice: Subject to any disclaimer, the term of this patent is extended or adjusted under 35 U.S.C. 154(b) by 0 days.

(21) Appl. No.: 09/751,499

(22) Filed: Dec. 29, 2000

(51) Int. Cl.[7] .................. G02B 27/14; G02B 27/12; G02B 21/00
(52) U.S. Cl. .................. 359/634; 359/637; 359/640; 353/33
(58) Field of Search ............... 359/634, 636, 359/637, 638, 639, 640, 649; 353/20, 31, 33; 348/335, 336, 337, 338, 339

(56) References Cited

U.S. PATENT DOCUMENTS

| | | | |
|---|---|---|---|
| 5,644,432 A | 7/1997 | Doany | 359/634 |
| 5,798,819 A * | 8/1998 | Hattori et al. | 353/33 |
| 6,144,498 A * | 11/2000 | Bryars et al. | 359/634 |
| 6,227,670 B1 * | 5/2001 | Numazaki et al. | 353/31 |
| 6,238,051 B1 * | 5/2001 | Huang | 353/81 |

* cited by examiner

Primary Examiner—Georgia Epps
Assistant Examiner—Sareed Seyrafi
(74) Attorney, Agent, or Firm—Merchant & Gould P.C.

(57) ABSTRACT

A projection display includes a light source for generating a beam output that contains first, second and third color components, a color separation/synthesizing prism unit having a color separation part for separating the beam output from the light source into the first, second and third color components that exit the prism unit in three different directions, and first, second and third light modulators for modulating the first, second and third color components that exit from the color separation part. The prism unit further has a color synthesizing part that receives the modulated first, second and third color components from the light modulators and that synthesizes the modulated first, second and third color components so as to form an output beam. A projection lens receives the output beam from the color synthesizing part, and is used to project a color image. The first, second and third color components have equal optical path lengths measured from the light source to the respective light modulator. The first, second and third color components further have equal optical path lengths measured from the respective light-modulator to the projection lens.

7 Claims, 6 Drawing Sheets

PROJECTION DISPLAY WITH COLOR SEPARATION/SYNTHESIZING PRISM UNIT

BACKGROUND OF THE INVENTION

1. Field of the Invention

The invention relates to a projection display, more particularly to a single-lens type projection display with a color separation/synthesizing prism unit.

2. Description of the Related Art

In a conventional projection display, white light is separated into first, second and third color components that are subsequently and respectively modulated by a corresponding light valve. The modulated color components are then synthesized to form an output beam prior to reception by a projection lens for projecting a color image on a display screen.

U.S. Pat. No. 5,644,432 discloses a three-prism color separator for use with three reflective light valves. As shown in FIG. 1, according to this patent, white light 10 from a polarizing cube 11 is separated into red, green and blue color components by an optical beam splitter 12 that includes first, second and third prisms 121, 122, 123. The three color components are directed by the three prisms 121, 122, 123 to three reflective light valves 131, 132, 133 for light modulation. Thereafter, the light-modulated color components retrace their paths through the three prisms 121, 122, 123 so as to be synthesized to form an output beam that is to be received by a projection lens (not shown) via the polarizing cube 11 for projecting a color image.

FIG. 2 illustrates another conventional projection display 2. The projection display 2 includes a light source 21 and a light filter 22 downstream of the light source 21 for removing ultra-violet rays and infra-red rays from a light beam generated by the light source 21 to obtain a white beam output. First and second beam splitters 231, 232 split the white beam output from the light filter 22 into first, second and third color components 201, 202, 203, such as red, green and blue color components. The first and second color components 201, 202 from the second beam splitter 232 are modulated by first and second transmissive light valves 251, 252, respectively. The third color component 203 from the first beam splitter 231 is reflected by a mirror 241 prior to modulation by a third transmissive light valve 253. After modulation, the three color components 201, 202, 203 are synthesized using two beam splitters 233, 234 and a mirror 242 prior to reception by a projection lens 26 for projecting an image on a display screen (not shown). Particularly, the first color component 201 is reflected once by the mirror 242 before passing through the beam splitter 233. The second color component 202 is reflected once by each of the beam splitters 234, 233. The third color component 203 passes through the beam splitter 234 before being reflected by the other beam splitter 233.

Because the three color components 201, 202, 203 either pass through or are reflected by the beam splitters 234, 233 and the mirror 242 in different ways during color synthesizing, minor differences inherent in the different optical paths can result in image distortion.

SUMMARY OF THE INVENTION

Therefore, the main object of the present invention is to provide a single-lens type projection display which utilizes a color separation/synthesizing prism unit to ensure uniformity of the optical path lengths for the different color components during color separation and color synthesizing to minimize the occurrence of image distortion.

Another object of the present invention is to provide a single-lens type projection display with a color separation/synthesizing prism unit and which has light modulators that use transmissive light valves.

According to this invention, a projection display comprises:

a light source for generating a beam output that contains first, second and third color components;

a color separation/synthesizing prism unit having a color separation part for separating the beam output from the light source into the first, second and third color components that exit the prism unit in three different directions;

first, second and third light modulator means, disposed adjacent to the prism unit, for modulating the first, second and third color components that exit from the color separation part of the prism unit;

the prism unit further having a color synthesizing part that receives the modulated first, second and third color components from the first, second and third light modulator means and that synthesizes the modulated first, second and third color components so as to form an output beam; and a projection lens for receiving the output beam from the color synthesizing part of the prism unit, and for projecting a color image.

The first, second and third color components have equal optical path lengths measured from the light source to the respective one of the first, second and third light modulator means. The first, second and third color components further have equal optical path lengths measured from the respective one of the first, second and third light modulator means to the projection lens.

Preferably, the prism unit includes first, second and third prisms, and the first, second and third color components exit the color separation part of the prism unit at the first, second and third prisms, respectively.

In the preferred embodiment, the color synthesizing part is vertically disposed relative to the color separation part of the prism unit. Each of the first, second and third light modulator means includes a transmissive light valve, a first mirror for reflecting the respective one of the first, second and third color components from the color separation part of the prism unit vertically, and a second mirror spaced apart vertically from the first mirror. The light valve is disposed between the second mirror and the color synthesizing part of the prism unit. The second mirror reflects the respective one of the first, second and third color components from the first mirror to the light valve.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
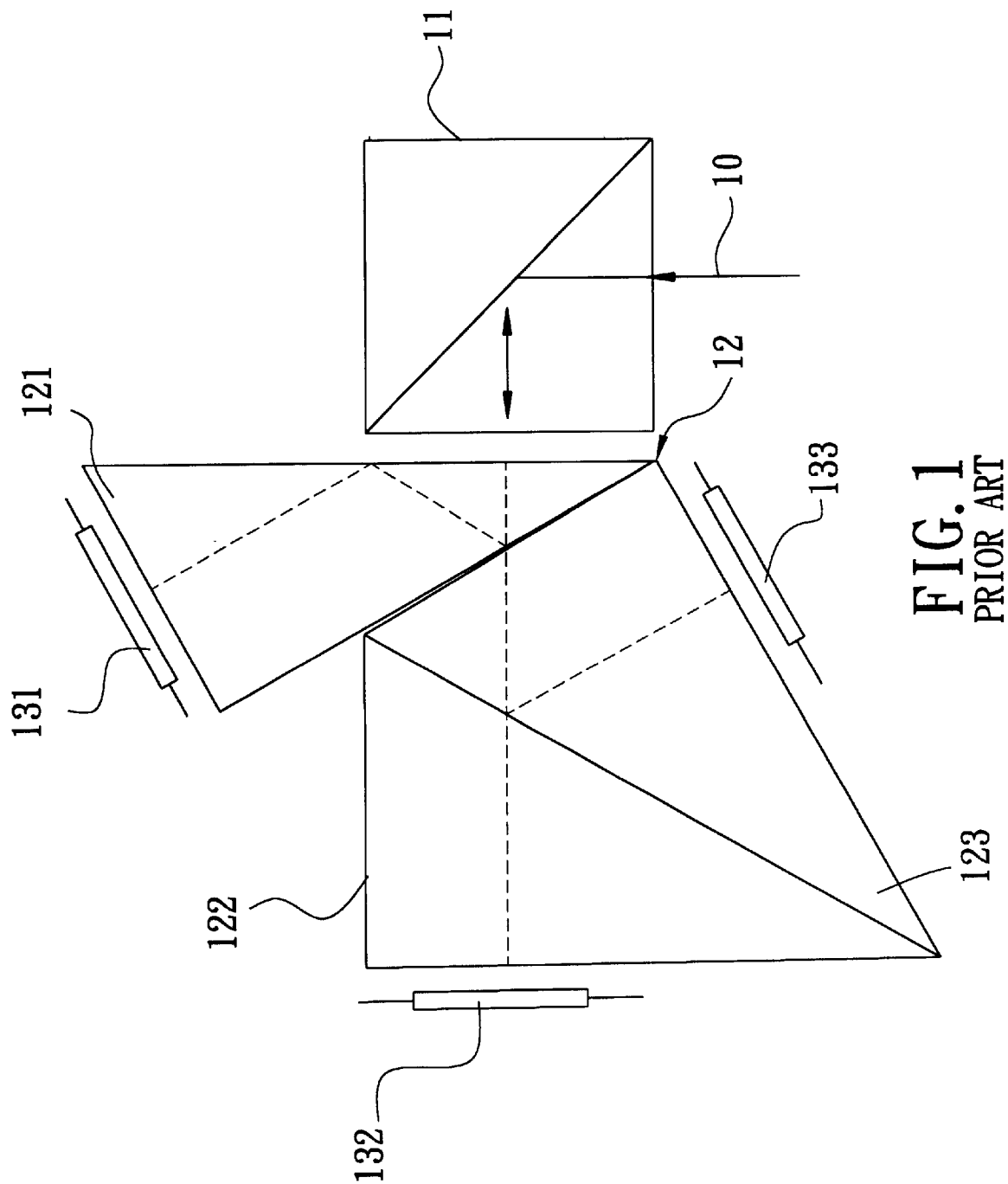
FIG. 1 illustrates a conventional projection display disclosed in U.S. Pat. No. 5,644,432.
Figure 2:
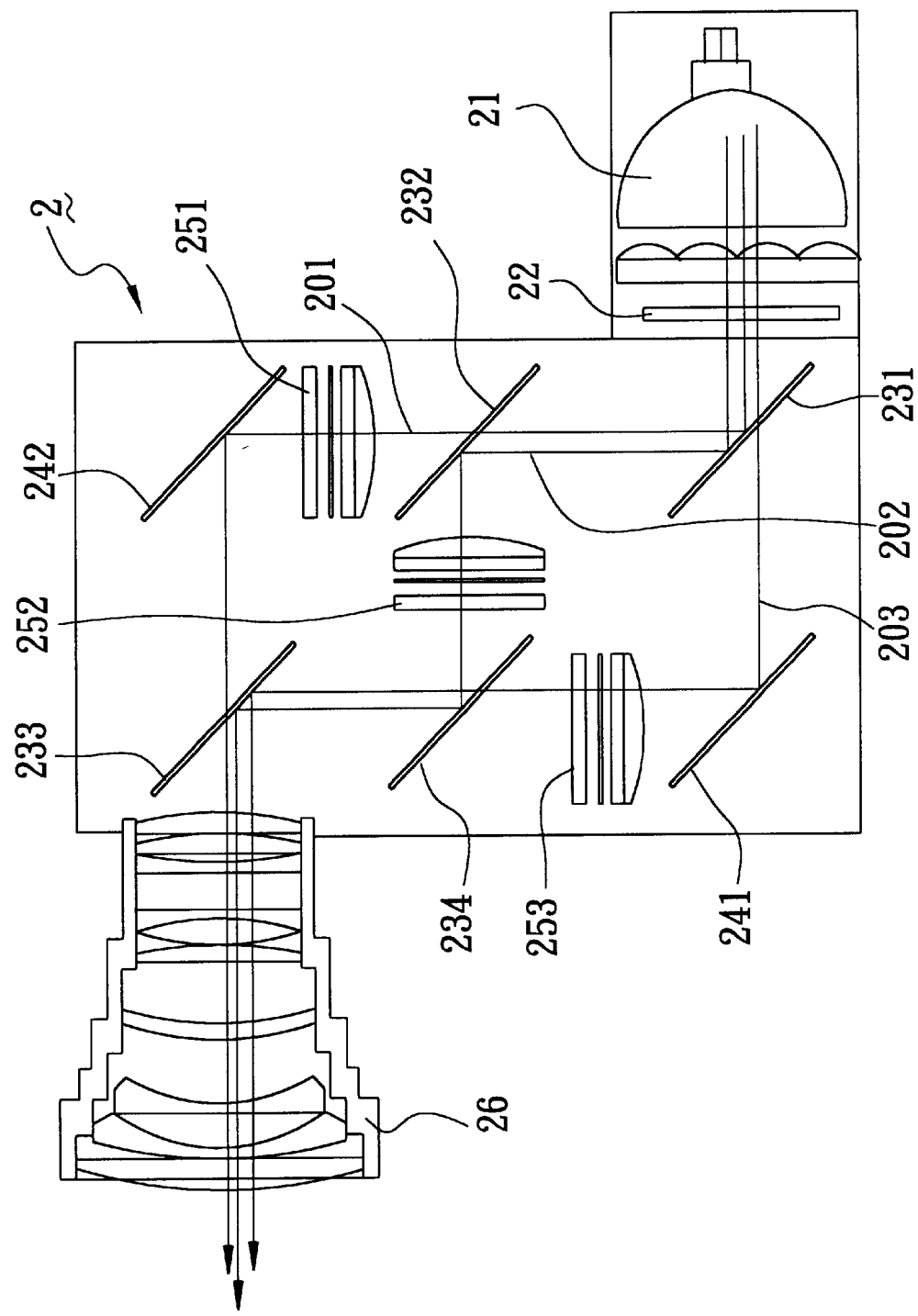
FIG. 2 illustrates another conventional projection display that utilizes transmissive light valves.
Figure 3:
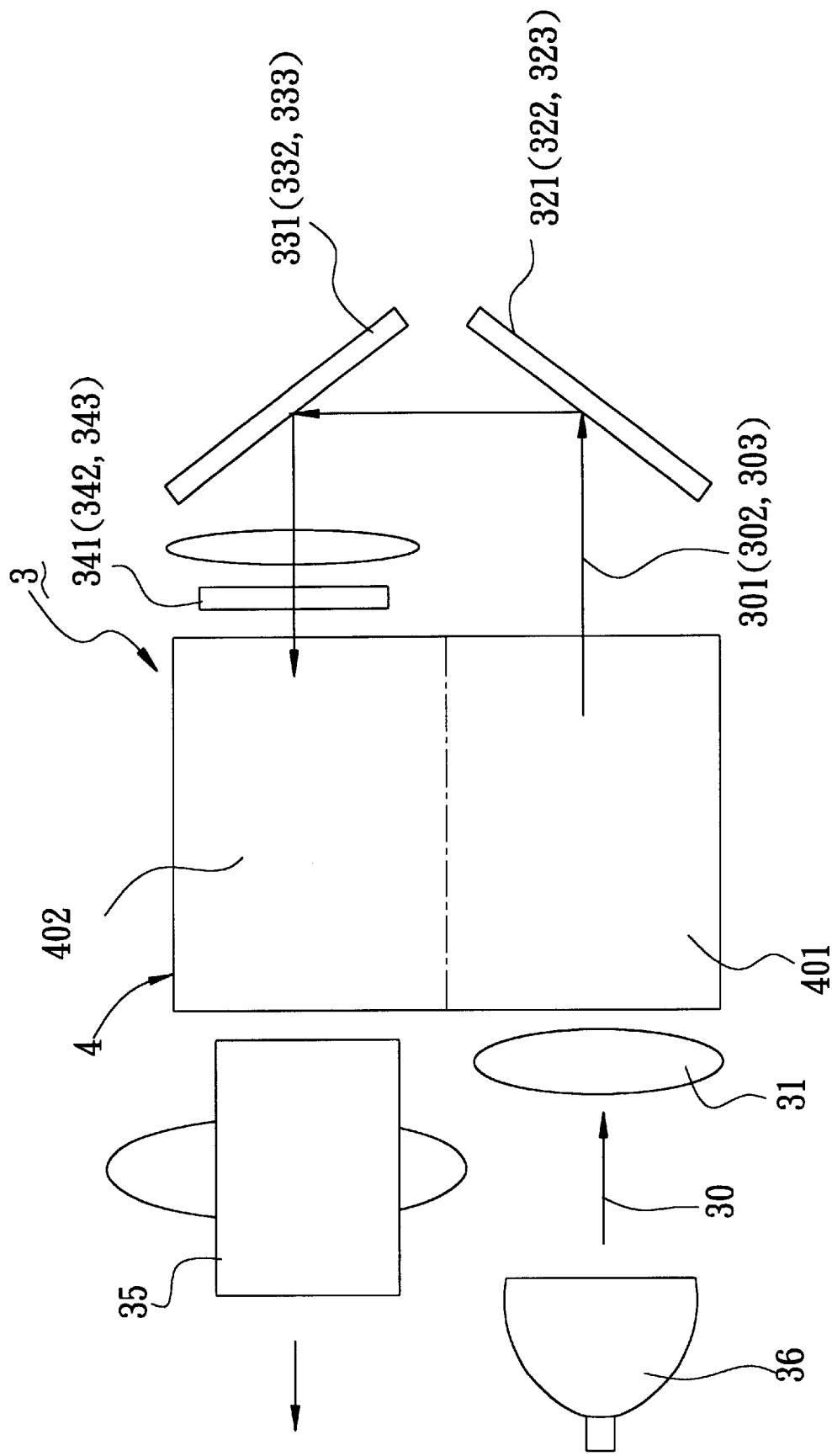
FIG. 3 is a schematic view showing the preferred embodiment of a single-lens type projection display according to this invention.

Referring to FIG. 3, the preferred embodiment of a projection display 3 according to the present invention is shown to comprise a color separation/synthesizing prism unit 4. A white beam output 30 from a light source 36 passes through a focusing lens 31 before reaching a lower color separation part 401 of the prism unit 4. The color separation part 401 separates the white beam output 30 into first, second and third color components 301, 302, 303, such as red, green and blue color components. After exiting the color separation part 401 in three different directions, the first, second and third color components 301, 302, 303 are processed by a corresponding light modulator that includes first and second mirrors 321, 331, 322, 332, 323, 333 and a transmissive light valve 341, 342, 343. Particularly, the first mirror 321, 322, 323 is disposed inclinedly to reflect the respective one of the first, second and third color components 301, 302, 303 from the color separation part 401 vertically upward. The second mirror 331, 332, 333 is spaced apart vertically from the corresponding first mirror 321, 322, 323. The light valve 341, 343, 343 is disposed between the corresponding second mirror 331, 332, 333 and the prism unit 4. The second mirror 331, 332, 333 is disposed inclinedly to reflect the respective one of the first, second and third color components 301, 302, 303 to the corresponding light valve 341, 342, 343. The modulated first, second and third color components 301, 302, 303 from the light valves 341, 342, 343 enter an upper color synthesizing part 402, which is vertically disposed relative to the color separation part 401, of the prism unit 4. The color synthesizing part 402 synthesizes the light-modulated color components so as to form an output beam that is provided to a projection lens 35 for projecting a color image on a display screen (not shown).

Figure 4:
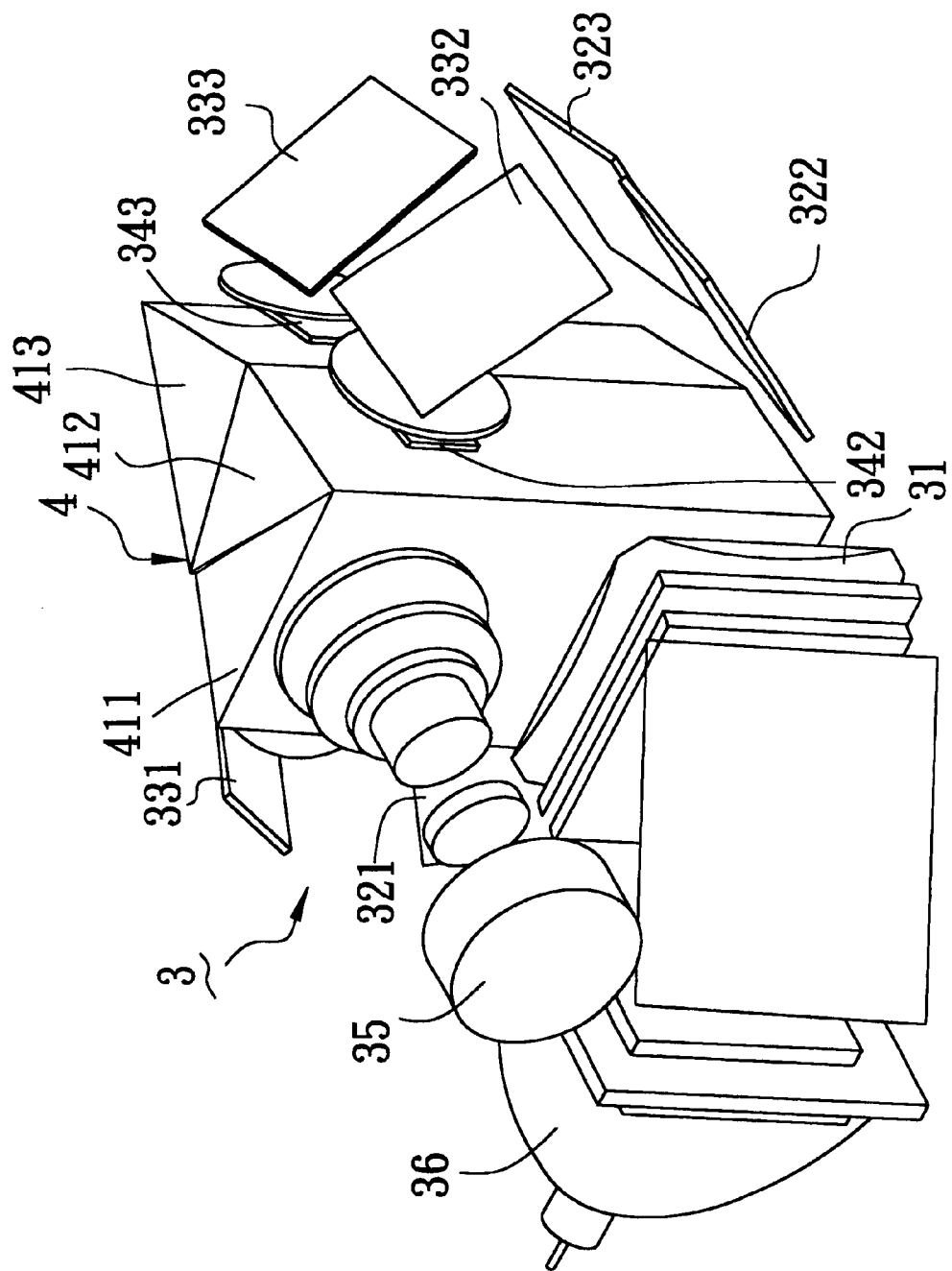
FIG. 4 is a perspective view of the preferred embodiment.
Figure 5:
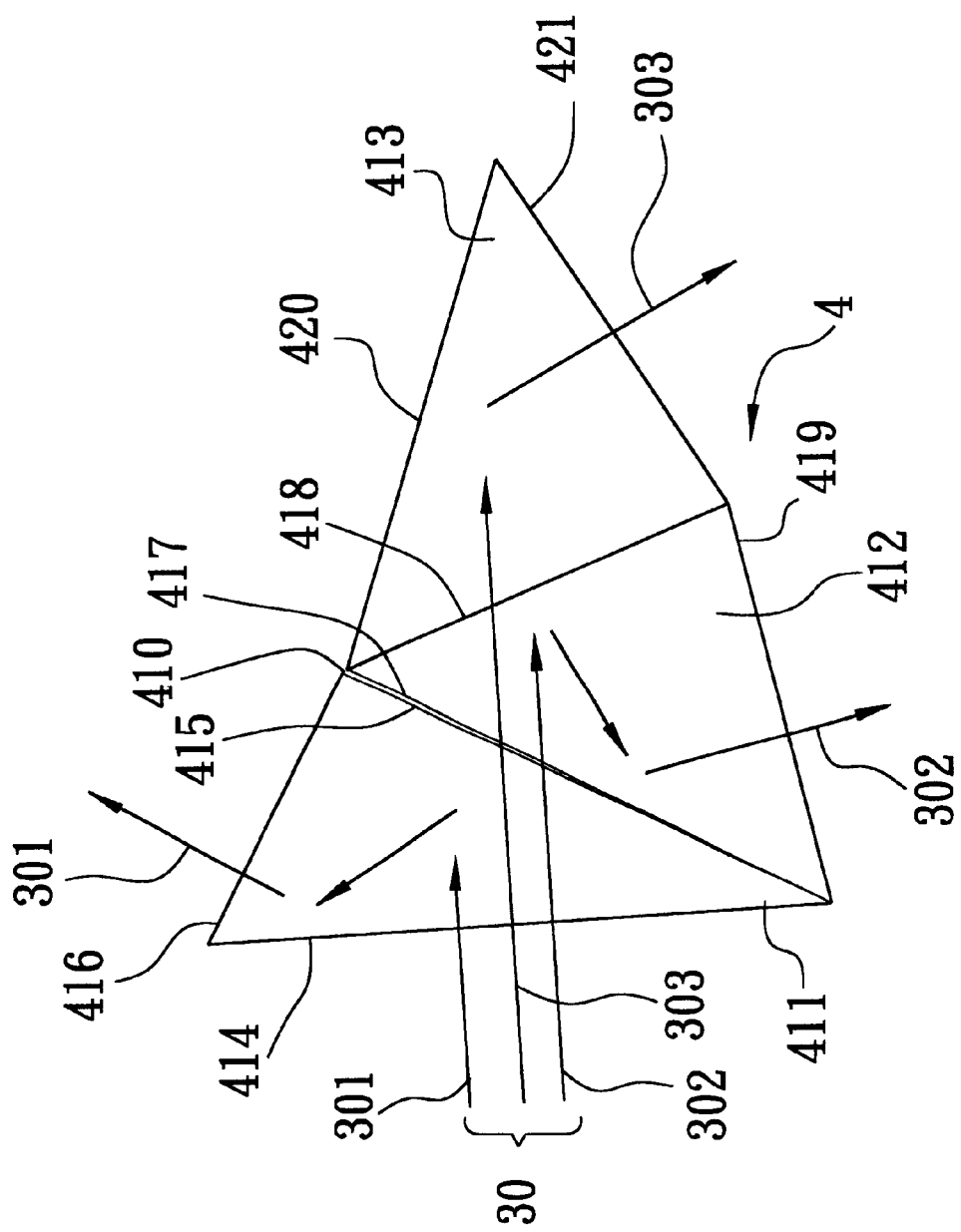
FIG. 5 is a schematic view illustrating a color separation operation of the preferred embodiment.
Figure 6:
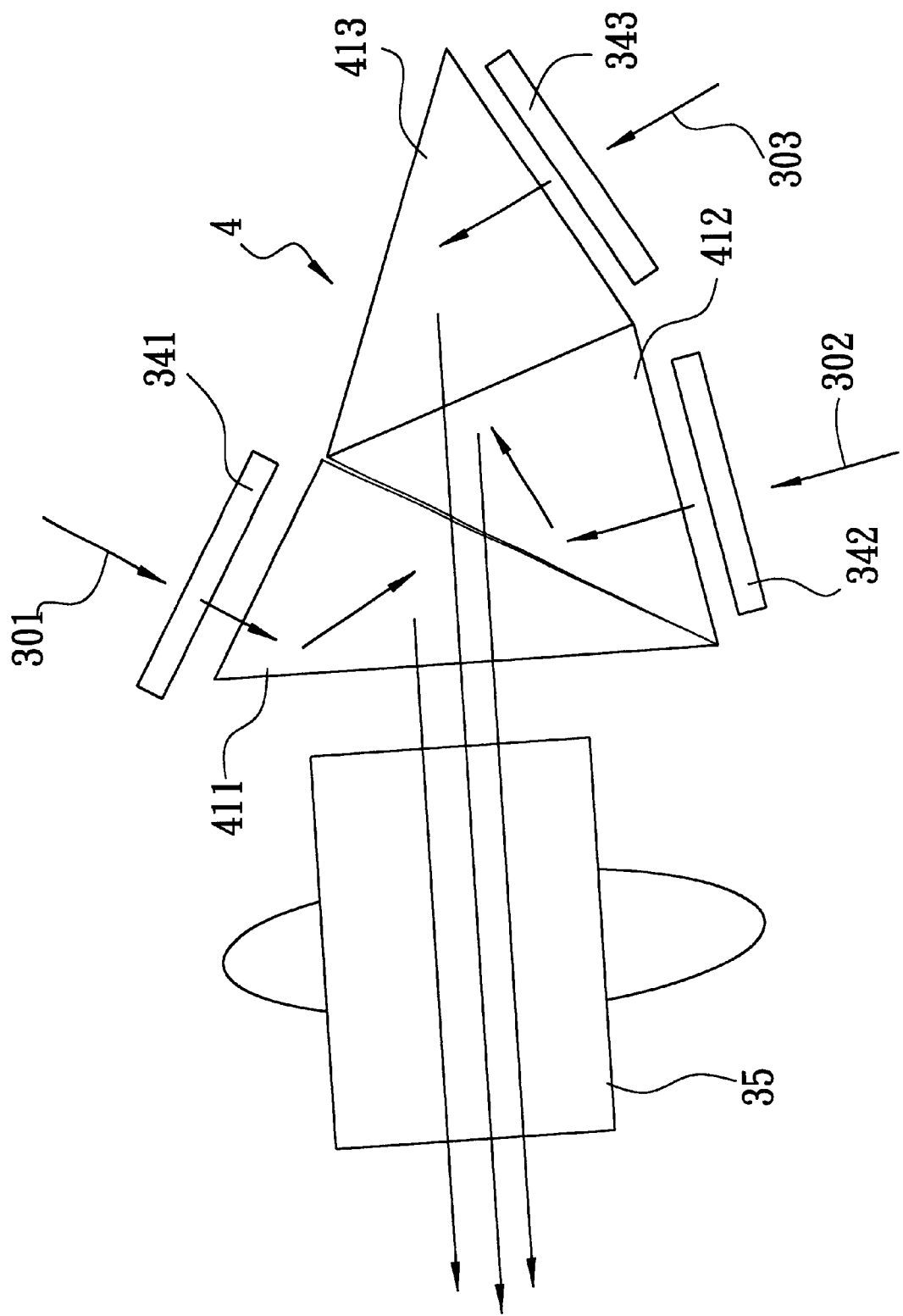
FIG. 6 is a schematic view illustrating a color synthesizing operation of the preferred embodiment.

Referring to FIGS. 4 to 6, the prism unit 4 includes first, second and third prisms 411, 412, 413. A lower part of the first, second and third prisms 411, 412, 413 serves as the color separation part 401 of the prism unit 4. An upper part of the first, second and third prisms 411, 412, 413 serves as the color synthesizing part 402 of the prism unit 4. The first, second and third prisms 411, 412, 413 are configured so as to rensure that the color components 301, 302, 303 have equal optical path lengths measured from the light source 36 to the respective one of the light valves 341, 342, 343, and that the color components 301, 302, 303 have equal optical path lengths measured from the respective one of the light valves 341, 342, 343 to the projection lens 35. A three-prism color separation arrangement having identical optical path lengths for three color components into and out of three prisms has been disclosed in U.S. Pat. No. 5,644,432 described beforehand. With reference to FIGS. 4 and 5, at the color separation part 401 of the prism unit 4, the first color component 301 is reflected by a first surface 415 to a second surface 414 of the first prism 411, and is further reflected by the second surface 414 S0 as to exit the first prism 411 at a third surface 416 of the latter. The second and third color components 302, 303 pass through the first surface 415 of the first prism 411, a clearance 410 formed between the first and second prisms 411, 412, and enter the second prism 412 via a first surface 417 of the latter. The second color component 302 is reflected by a second surface 418 back to the first surface 417 of the second prism 412, and is further reflected by the first surface 417 S0 as to exit the second prism 412 at a third surface 419 of the latter. The third color component 303 passes through the second surface 418 of the second prism 412, enters the third prism 413, and is reflected by a first surface 420 of the third prism 413 so as to exit the third prism 413 at a second surface 421 of the same. As such, the first, second and third color components 301, 302, 303 exit the color separation part 401 of the prism unit 4 at the first, second and third prisms 411, 412, 413, respectively.

With reference to FIGS. 4 and 6, after being reflected by the first and second mirrors 321, 331, 322, 332, 323, 333 and modulated by the light valve 341, 342, 343 of the corresponding light modulator, the light-modulated first, second and third color components 301, 302, 303 enter the upper part of the first, second and third prisms 411, 412, 413 in three different directions for color synthesizing. Since the paths traveled by the three color components 301, 302, 303 through the first, second and third prisms 411, 412, 413 during color synthesizing are simply the opposite of those traveled by the three color components 301, 302, 303 through the first, second and third prisms 411, 412, 413 during color separation, a detailed description of the same will be dispensed with herein for the sake of brevity. The color-synthesized output beam from the prism unit 4 is subsequently provided to the projection lens 35 for projecting a color image on the display screen (not shown).

Because the three color components 301, 302, 303 are separated and then synthesized using the same prism unit 4, differences in the optical paths of the color components 301, 302, 303 during color separation and color synthesizing can be minimized to avoid the occurrence of image distortion.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A projection display comprising:

a light source for generating a beam output that contains first, second and third color components;

a color separation/synthesizing prism unit having a color separation part for separating the beam output from said light source into the first, second and third color components that exit said prism unit in three different directions;

first, second and third light modulator means, disposed adjacent to said prism unit, for modulating the first, second and third color components that exit from said color separation part of said prism unit;

said prism unit further having a color synthesizing part that receives the modulated first, second and third color components from said first, second and third light modulator means and that synthesizes the modulated first, second and third color components so as to form an output beam; and a projection lens for receiving the output beam from said color synthesizing part of said prism unit, and for projecting a color image;

wherein the first, second and third color components have equal optical path lengths measured from said light source to the respective one of said first, second and third light modulator means; and wherein the first, second and third color components have equal optical path lengths measured from the respective one of said first, second and third light modulator means to said projection lens.

2. The projection display of claim 1, wherein said prism unit includes first, second and third prisms.

3. The projection display of claim 2, wherein the first, second and third color components exit said color separation part of said prism unit at said first, second and third prisms, respectively.

4. The projection display of claim 3, wherein said color separation part is a lower part of said first, second and third prisms, and said color synthesizing part is an upper part of said first, second and third prisms.

5. The projection display of claim 1, wherein each of said first, second and third light modulator means includes a transmissive light valve.

6. The projection display of claim 5, wherein said color synthesizing part is vertically disposed relative to said color separation part of said prism unit.

7. The projection display of claim 6, wherein each of said first, second and third light modulator means further includes:

a first mirror for reflecting the respective one of the first, second and third color components from said color separation part of said prism unit vertically; and a second mirror spaced apart vertically from said first mirror, said light valve being disposed between said second mirror and said color synthesizing part of said prism unit, said second mirror reflecting the respective one of the first, second and third color components from said first mirror to said light valve.

* * * * *